J. A. TORRENS.
WATER VALVE FOR CARBURETERS AND VAPORIZERS OF INTERNAL COMBUSTION ENGINES.
APPLICATION FILED MAR. 28, 1918.
1,343,488. Patented June 15, 1920.
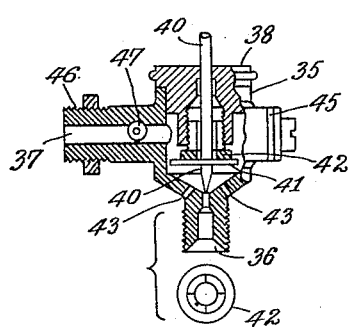
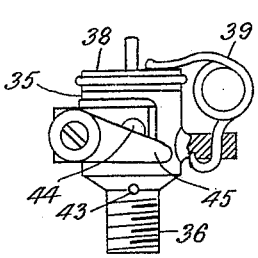
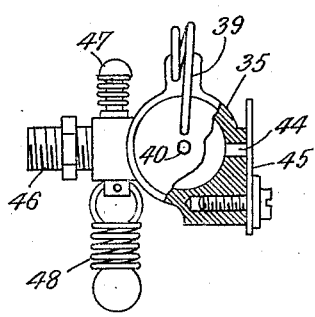
INVENTOR:
John Arthur Torrens
By. Attys

UNITED STATES PATENT OFFICE.

JOHN ARTHUR TORRENS, OF MUCKAMORE, IRELAND.

WATER-VALVE FOR CARBURETERS AND VAPORIZERS OF INTERNAL-COMBUSTION ENGINES.

1,343,488.     Specification of Letters Patent.     Patented June 15, 1920.

Application filed March 28, 1918. Serial No. 225,161.

*To all whom it may concern:*

Be it known that I, JOHN ARTHUR TORRENS, of "Moylena," Muckamore, in the county of Antrim, Ireland, major late Scots Greys, subject of the King of Great Britain and Ireland, have invented certain new and useful Improvements in or Relating to Water-Valves for Carbureters and Vaporizers of Internal-Combustion Engines, of which the following is a specification.

This invention relates to water valves for carbureters and vaporizers for internal combustion engines. The object of this invention is to provide an improved water valve for a carbureter and vaporizer which is adapted for use with heavy liquid fuel.

Apparatus made in accordance with this invention comprises means for admitting aqueous vapor to the induction pipe said means comprising a casing, a water inlet to the casing, a needle valve adapted to regulate the inlet, means for adjusting the lift of the valve, means for admitting air to the casing and permitting the escape of surplus water, means for controlling the water supply and the time at which it comes into action during each suction stroke of the engine according to the throttle valve opening.

Figure 1 is a section of the water end of valve.

Fig. 2 is a part sectional plan of Fig. 1.

Fig. 3 is an elevation of the water valve.

The water valve casing 35 is provided with a water inlet 36 and an outlet 37. The casing is provided with a cap 38 adapted to be held in position by a spring 39. Within the casing is a needle valve 40 provided with a flange 41. The lift of the valve is limited by the flange 41 striking the split screw 42 through which the needle valve passes. The amount of lift being regulated by adjusting the position of the screw. 43 43 are holes admitting air and allowng surplus water if any to escape. 44 is an air inlet adapted to be controlled by a shutter 45. The casing is adapted to be attached to the induction pipe, main air inlet or vaporizer by a screw-connection 46. A spring pressed plug 47 keeps the outlet 37 normally closed. Means being provided by which it can be opened by the driver when desired as for instance by a Bowden wire mechanism attached to the spring connection 48.

In use the water enters the inlet 36 by the pull of the engine and passes the flange 41 to the outlet 37. When the plug valve 47 is open the water will pass through the valve immediately the engine starts if shutter 45 is closed but if the shutter 45 is opened the inlet of the water is delayed depending on the extent to which it is opened.

In operation air and aqueous vapor enter the induction pipe as already described, where it meets the main air supply and fuel.

What I claim as my invention, and desire to secure by Letters Patent, is:—

A water valve for carbureters and vaporizers comprising a casing, a water inlet at the bottom of the casing, a needle valve within said casing, a flange on said needle valve, holes in said casing below said flange to admit air to said casing and allow surplus water to escape from the casing, an air inlet to said casing above the said flange, a shutter to said air inlet above the flange, a water outlet from the casing, and a spring-pressed plug valve for the outlet.

In witness whereof, I have hereunto signed my name.

JOHN ARTHUR TORRENS.